United States Patent [19]

Murao

[11] Patent Number: 5,003,378

[45] Date of Patent: Mar. 26, 1991

[54] AUTOMATIC WHITE BALANCE CIRCUIT

[75] Inventor: Fumihide Murao, Itami, Japan

[73] Assignee: Mitsubishi Denki Kabushiki Kaisha, Tokyo, Japan

[21] Appl. No.: 388,078

[22] Filed: Aug. 1, 1989

[30] Foreign Application Priority Data

Jan. 18, 1989 [JP] Japan .................. 1-9017

[51] Int. Cl.$^5$ .............................................. H04N 9/04
[52] U.S. Cl. .................................................... 358/29
[58] Field of Search ........................................ 358/29

[56] References Cited

U.S. PATENT DOCUMENTS

| 4,506,290 | 3/1985 | Hashimoto | 358/29 C |
| 4,595,946 | 6/1986 | Uehara et al. | 358/29 C |
| 4,847,680 | 7/1989 | Okino | 358/29 C |

FOREIGN PATENT DOCUMENTS

| 59-141888 | 8/1984 | Japan . | |
| 0240291 | 11/1985 | Japan | 358/29 C |
| 61-128693 | 6/1986 | Japan . | |

Primary Examiner—James J. Groody
Assistant Examiner—David E. Harvey
Attorney, Agent, or Firm—Oblon, Spivak, McClelland, Maier & Neustadt

[57] ABSTRACT

A ripple detecting circuit (16) outputs a signal of a "0" level in an ON state of a light source (1) and a signal of a "1" level in an OFF state of the light source (1) when a flashing frequency of the light source (1) exceeds a prescribed frequency, while outputting a signal of a "0" level when the former is less than the latter. A holding circuit (17) outputs a ratio signal from a ratio signal generating means in response to the signal of a "0" level supplied from the ripple detecting circuit (16) while holding and outputting a ratio signal immediately ahead of change from a "0" level into a "1" level in response to the signal of a "1" level. A white balance adjusting circuit (15) performs white balance adjustment in response to an output from the holding circuit (17). When the prescribed frequency is set at a limit flashing frequency of the light source (1) substantially allowing no visual recognition, no white balance adjustment is performed on the basis of a signal in an OFF state of the light source (1) if flashing of the light source (1) cannot be visually recognized.

9 Claims, 10 Drawing Sheets

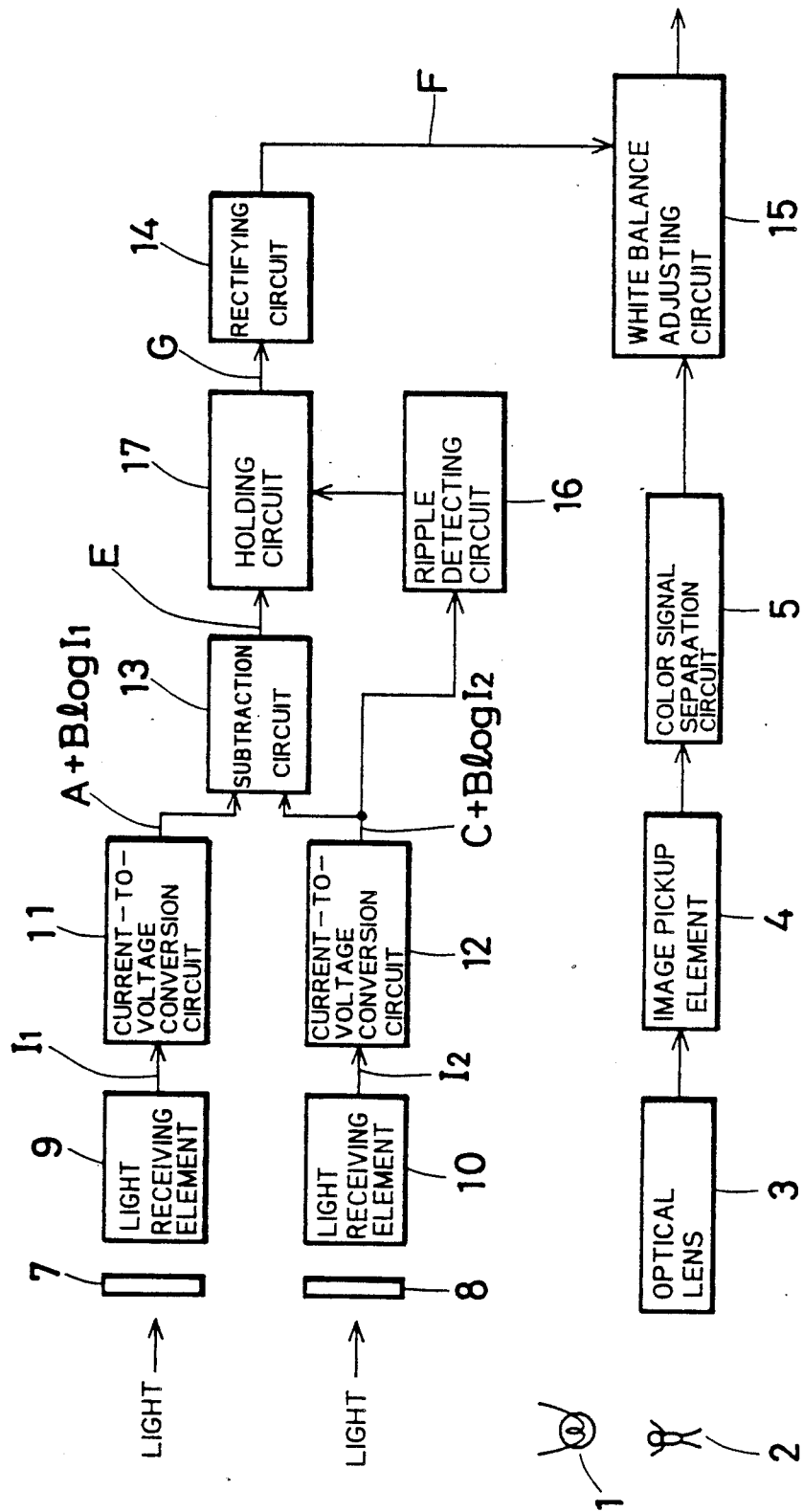

AUTOMATIC WHITE BALANCE CIRCUIT

BACKGROUND OF THE INVENTION

1. Field of the Invention

The present invention relates to an automatic white balance circuit which is employed for a color video camera, a color electronic camera or the like.

2. Description of the Background Art

In the image of an object taken by a color video camera, for example, the white balance is varied with ratios between color components of light which is applied to the object. Therefore, the white balance must be adjusted following change in the ratios between such color components of light which is emitted from a light source, in order to obtain a color image of high quality in color video camera. To this end, an automatic white balance circuit is generally employed together with an image pickup element, to measure the ratios between color components of light which is applied to the object of the image pickup element, for automatically adjusting the white balance on the basis of the result of such measurement.

FIG. 1 is a block diagram showing partial structure of a conventional color video camera having such an automatic white balance circuit. Light from a light source 1 is reflected by an object 2, and supplied to an image pickup element 4 through an optical lens 3. The image pickup element 4 convertes the received light into electric signal and supplies the same to a color signal separation circuit 5. The color signal separation circuit 5 separates the electric signal into three electric color signals and supplies the same to a white balance adjusting circuit 15. The white balance adjusting circuit 15 amplifies the respective color signals in response to a white balance control voltage F as hereinafter described, and outputs the same.

The light from the light source I is also supplied to color filters 7 and 8. The color filters 7 and 8 have different transmission characteristics, so that different specific color components pass through the color filters 7 and 8, respectively. Light receiving elements 9 and 10 receive the color components and convert the same into currents $I_1$ and $I_2$, respectively. A current-to-voltage conversion circuit (hereinafter referred to as "I-V conversion circuit") converts the current $I_1$ into a logarithmically compressed voltage of $A+Blog I_1$, where A and B represent constants. Another I-V conversion circuit 12 converts the current $I_2$ into a logarithmically compressed voltage of $C+Blog I_2$, where C represents a constant. A subtraction circuit 13 receives the voltages output from the I-V conversion circuits 11 and 12, to output a difference voltage E of $D+Blog(I_1/I_2)$, where D represents a constant. A rectifying circuit 14 integrates the difference voltage E from the subtraction circuit 13. The output of the rectifying circuit 14 is supplied to the white balance adjusting circuit 15 as the white balance control voltage F. The white balance adjusting circuit 15 changes amplification degrees of the respective color signals in response to the white balance control voltage F, to adjust the ratios between the color signals. Thus, the while balance adjusting circuit 15 outputs the color signals, which are subjected to white balance adjustment.

In the conventional color video camera having the aforementioned structure, the following problems are caused when the light source 1 is formed by a flashing one such as a fluorescent lamp, which flashes too instantaneous for visual recognition: As shown in FIG. 3, output voltages X and Y of the I-V conversion circuits and 12 have waveforms which are synchronous to flashing of the light source I, as shown in FIG. 2. The output voltage E of the subtraction circuit 13 also forms waveshape corresponding to the flashing of the light source as shown in FIG. 2, since each color component of light varies its fading speed when the light source 1 goes off. The aforementioned white balance adjustment is therefore performed by a white balance control voltage F which is integrated signals including an output voltage E of the subtraction circuit 13 when the light source 1 goes off. Meanwhile, when the flashing of the light source is too instantaneous for human eyes, human eyes receive information given when the light source 1 is on, and the image pickup element 4 outputs the signal based on information given when the light source 1 is on. However, the aforementioned white balance adjustment is still performed in such a case of the flashing light source described above, whereby the white balance gets rather out of order.

SUMMARY OF THE INVENTION

The present invention is directed to an automatic white balance circuit contained in an image pickup apparatus for automatically adjusting white balance when there is a change in ratios between respective color components included in light applied to an object taken by the image pickup apparatus from a light source. An automatic white balance circuit according to the present invention comprises ratio signal generating means for receiving the light from the light source to generate and output a ratio signal indicating a ratio of prescribed two of the color components included in the light, a ripple detecting circuit for detecting a ripple of the light source to output a first signal in an ON state of the light source and a second signal in an OFF state of the light source when a flashing frequency of the light source exceeds a prescribed frequency and output a third signal when the former is less than the latter, holding circuit connected to the ratio signal generating means and the ripple detecting circuit for outputting the ratio signal from the ratio signal generating means in response to the first or third signal supplied from the ripple detecting circuit while holding and outputting the ratio signal from the ratio signal generating means in an ON state of the light source in response to the second signal, and a white balance adjusting circuit for performing white balance adjustment in accordance with an output from the holding circuit.

According to the present invention, there is provided a ripple detecting circuit which outputs a first signal in an ON state of a light source while outputting a second signal in an OFF state of the light source when a flashing frequency of the light source exceeds a prescribed frequency and outputs a third signal when the former is less than the latter and a holding circuit which outputs a ratio signal from ratio signal generating means in response to the first or third signal supplied from the ripple detecting circuit while holding and outputting a ratio signal from the ratio signal generating means in an ON state of the light source in response to the second signal. The prescribed frequency is set at a frequency corresponding to a boundary as to whether or not flashing of the light source is visually recognizable, so that white balance adjustment is not performed on the basis of a signal in an OFF state of the light source when the light source is a flashing one which flashes too instantaneous for visual recognition, dissimilarly to the conventional case. Consequently, no deterioration is caused in white balance as the result of white balance adjustment, even if the image of an object is taken under an instantaneous flashing light source whose flashing cannot be visually recognized.

Accordingly, an object of the present invention is to provide an automatic white balance circuit, which can perform correct white balance adjustment even if a light source for applying light to an object is flashing one which flashes too instantaneous for visual recognition.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram showing another embodiment of the present invention.

DETAILED DESCRIPTION OF THE PREFERRED EMBODIMENTS

Figure 4:
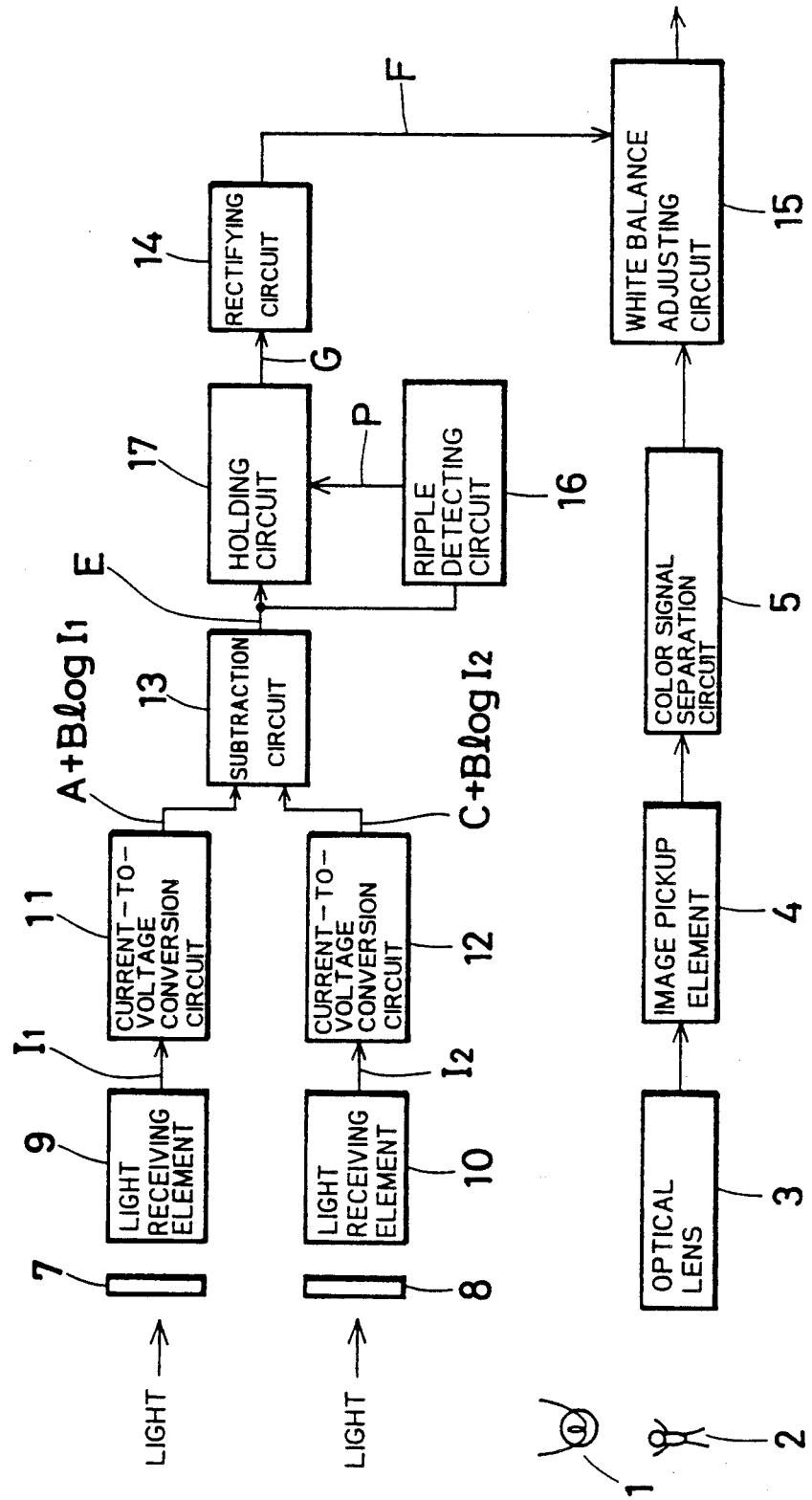
FIG. 4 is a block diagram showing partial structure of color video camera employing an embodiment of an automatic white balance circuit according to the present invention.
Figure 5:
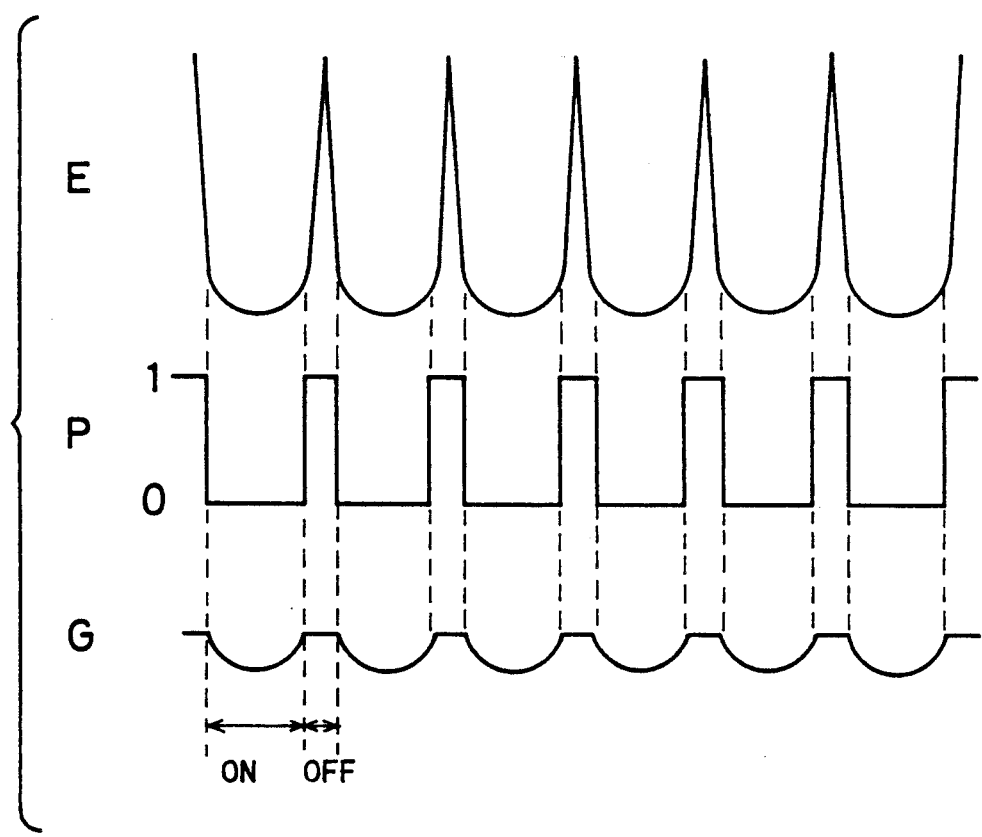
FIG. 5 is a waveform diagram for illustrating operation of the circuit shown in FIG. 4.

FIG. 4 is a block diagram showing partial structure of a color video camera which comprises an automatic white balance circuit according to an embodiment of the present invention. Referring to FIG. 4, this structure is different from the conventional circuit shown in FIG. in that a ripple detecting circuit 16 and a holding circuit l7 are newly provided.

The ripple detecting circuit 16 is connected to an output of a subtraction circuit 13, and outputs a signal P according to the frequency of an output voltage E of the subtraction circuit 13, to supply the same to the holding circuit 17.

The holding circuit 17 is connected to the subtraction circuit 13, a rectifying circuit 14 and the ripple detecting circuit 16, and supplies the rectifying circuit 14 with a signal according to the level of the signal P supplied from the ripple detecting circuit 16. Other structure is similar to the conventional one.

Figure 6:
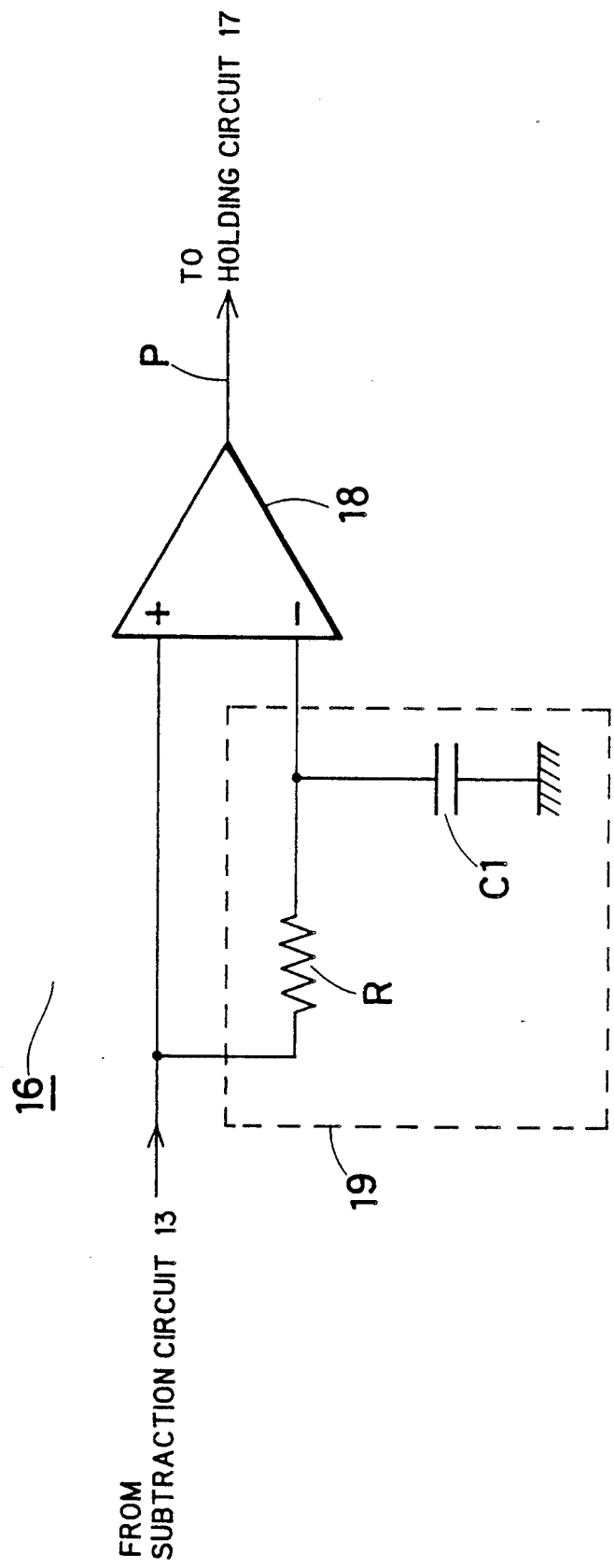
FIG. 6 is a circuit diagram showing exemplary structure of a ripple detecting circuit.

FIG. 6 is a circuit diagram showing exemplary structure of the ripple detecting circuit 16. An output of the subtraction circuit 13 is directly received in a plus input of an operational amplifier 18, while being also received in its minus input through a low-pass filter 19, which is formed by a resistor R and a capacitor C1. An output of the operational amplifier 18 is supplied to the rectifying circuit 14.

Figure 7:
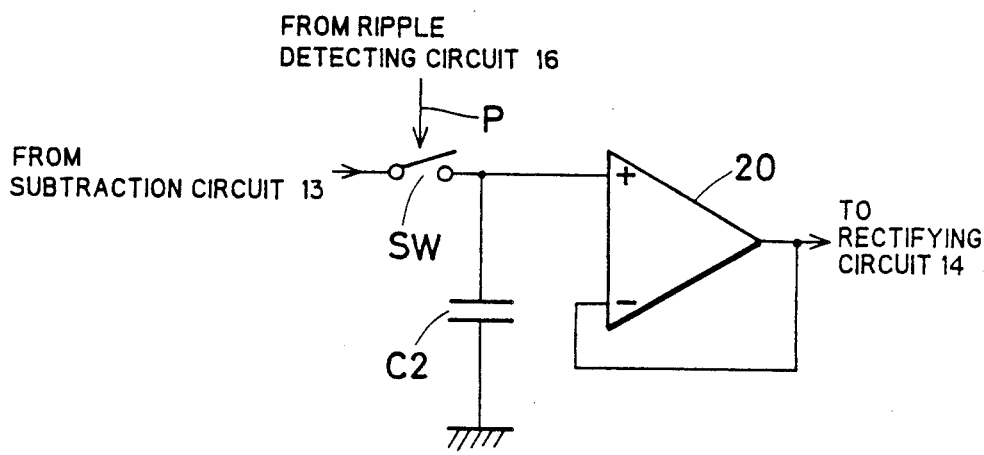
FIG. 7 is a circuit diagram showing exemplary structure of a holding circuit.

FIG. 7 is a circuit diagram showing exemplary structure of the holding circuit 17. The output voltage E of the subtraction circuit 13 is supplied to a plus input of an operational amplifier 20 through a switch SW. The switch SW goes on in response to a "0" level of the pulse P from the ripple detecting circuit 16, and goes off in response to a "1" level. A capacitor C2 is connected between the plus input of the operational amplifier 20 and the ground, and an output of the operational amplifier 20 is fed back to its minus input while being supplied to the rectifying circuit 14. The operational amplifier 20 serves as a voltage follower buffer circuit.

Figure 8:
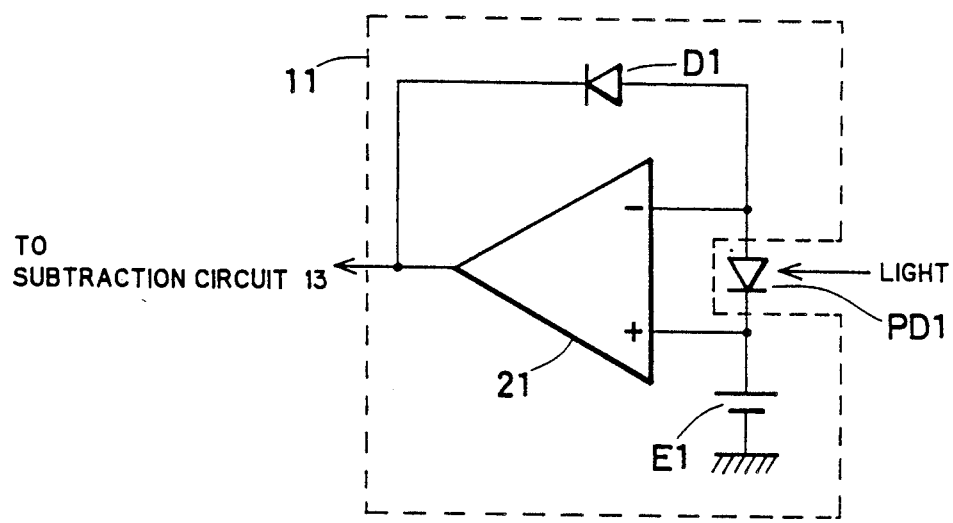
FIG. 8 and FIG. 12 are circuit diagrams showing examples of the structure of a light receiving element combined with an I-V conversion circuit.

FIG. 8 is a circuit diagram showing exemplary structure of a light receiving element 9 and an I-V conversion circuit A photodiode PD1 corresponding to the light receiving element 9 is connected across minus and plus inputs of an operational amplifier 21. The photodiode PD1 has a cathode which is connected to the plus input of the operational amplifier 21 and an anode which is connected to the minus input thereof, respectively. The plus input of the operational amplifier 21 is grounded through a power source E1. A diode D1 has an anode which is connected to the minus input of the operational amplifier 21, and a cathode which is connected to the output of the operational amplifier 21. The output of the operational amplifier 21 is connected to the subtraction circuit 13.

Figure 9:
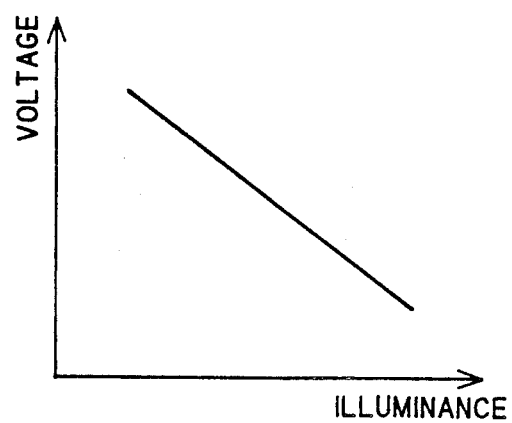
FIG. 9 and FIG. 13 are graphs showing characteristics of the circuits shown in FIG. 8 and FIG. 12, respectively.

FIG. 9 is a graph showing relationship between illuminance of light applied to the photodiode PD1 in the circuit shown in FIG. 8 and an output voltage of the I-V conversion circuit As shown in FIG. 9, the output voltage of the I-V conversion circuit is monotonously decreased with increase in illuminance of the light applied to the photodiode PD1. A light receiving element 10 and an I-V conversion circuit 12 are similar in structure to those shown in FIG. 8, while characteristics thereof are also identical to those shown in FIG. 9.

Figure 10:
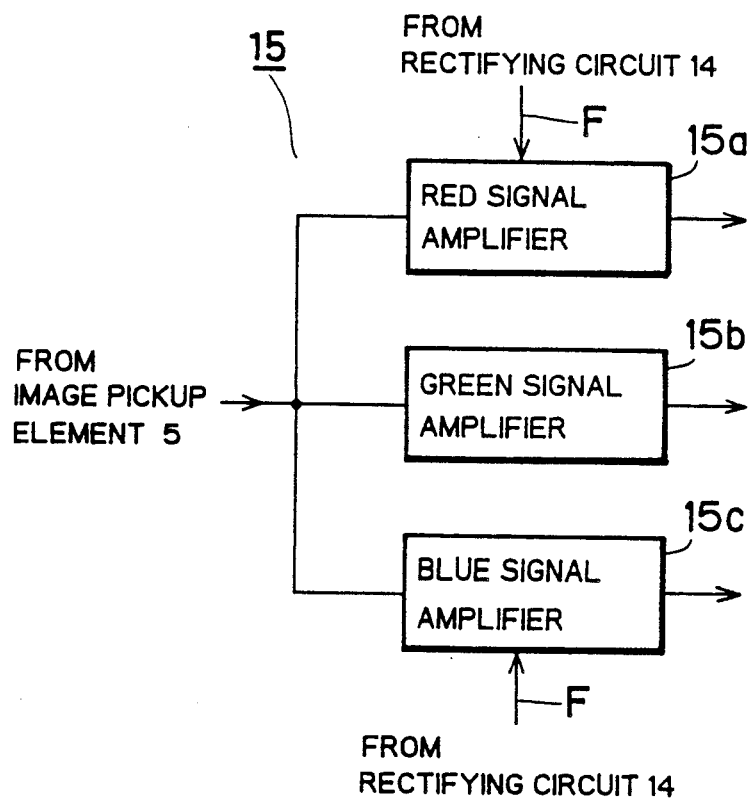
FIG. 10 is a block diagram showing exemplary structure of a white balance adjusting circuit.

FIG. 10 is a block diagram showing exemplary structure of a white balance adjusting circuit 15. Respective color signals from an image pickup element 5 are supplied to a red signal amplifier 15a, a green signal amplifier 15b and a blue signal amplifier 15c respectively. These amplifiers 15a, 15b and 15c amplify and output the corresponding color signals. A white balance control voltage F from the rectifying circuit 14 is supplied to the red signal amplifier 15a and the blue signal amplifier 15c. Amplification factors of the red signal amplifier 15a and the blue signal amplifier 15c are adjusted according to the white balance control voltage F. Consequently, the ratios between red, blue and green signals are adjusted to perform white balance adjustment.

With reference to FIG. 4 to FIG. 7, description will now be made on operation for taking the image of an object 2 through the color video camera having the structure shown in FIG. 4 under a flashing light source.

The light from the light source 1 is reflected by the object 2, and supplied to an image pickup element 4 through an optical lens 3. The image pickup element 4 convertes the received light into electric signal and supplies the same to a color signal separation circuit 5. The color signal separation circuit 5 separates the electric seignal into three electric color signals (red, green and blue signals), and supplies the same to the white balance adjusting circuit 15. The white balance adjusting circuit 15 amplifies the respective color signals in accordance with the white balance control voltage F as hereinafter described.

The light from the light source 1 is also supplied to color filters 7 and 8. The color filters 7 and 8 have different characteristics so that different specific color components pass through the color filters 7 and 8, respectively. The light receiving elements 9 and 10 receive the corresponding color components and convert the same into currents $I_1$ and $I_2$, respectively. The I-V conversion circuit 11 converts the current $I_1$ into logarithmically compressed voltage of $A + Blog I_1$. The I-V conversion circuit 12 converts the current $I_2$ into logarithmically compressed voltage of $C + Blog I_2$. The subtraction circuit 13 receives output voltages of the I-V conversion circuits 11 and 12, to output a difference voltage E of $D + Blog(I_1/I_2)$.

Figure 1:
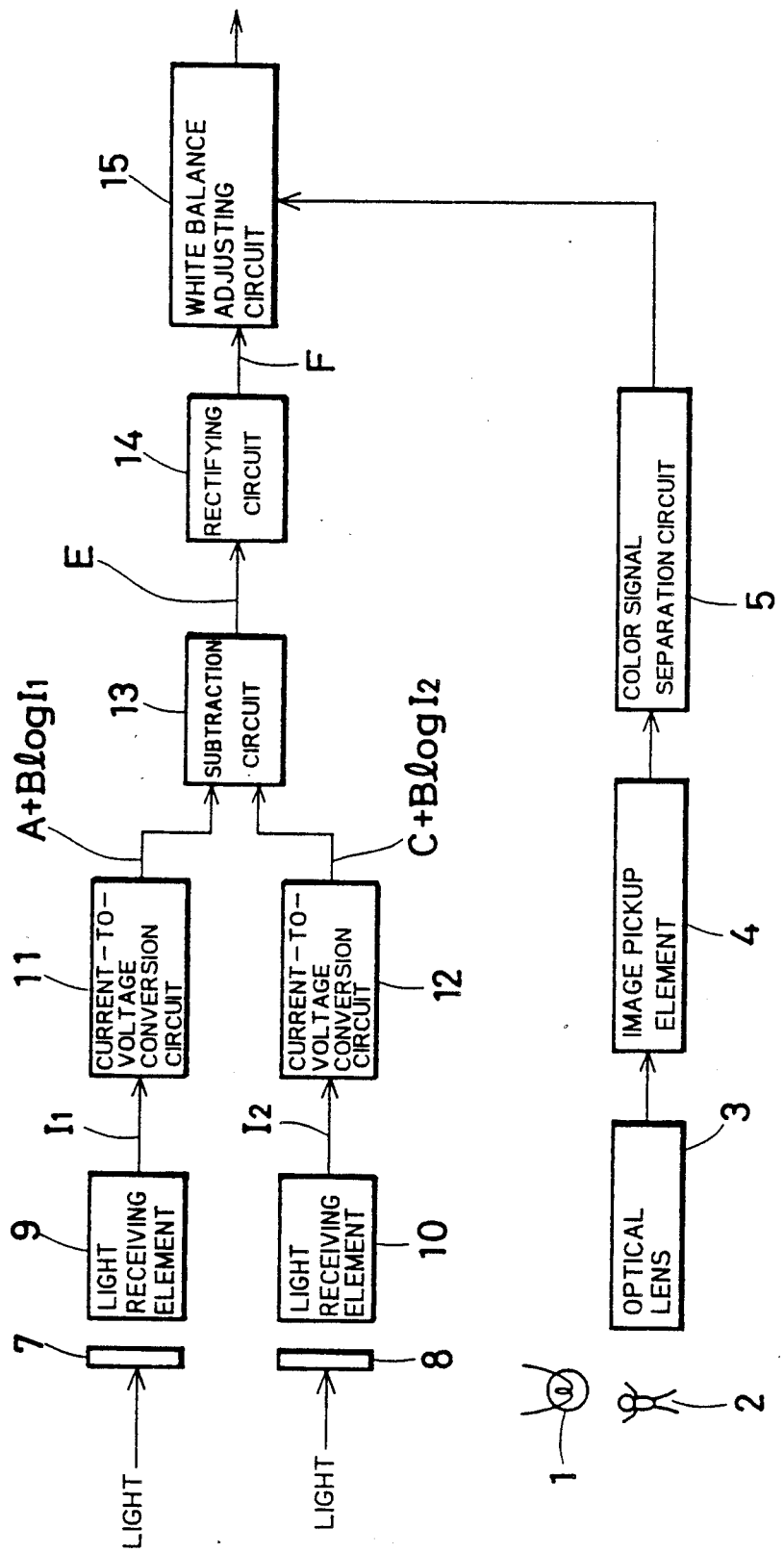
FIG. 1 is a block diagram showing partial structure of a conventional color video camera.
Figure 2:
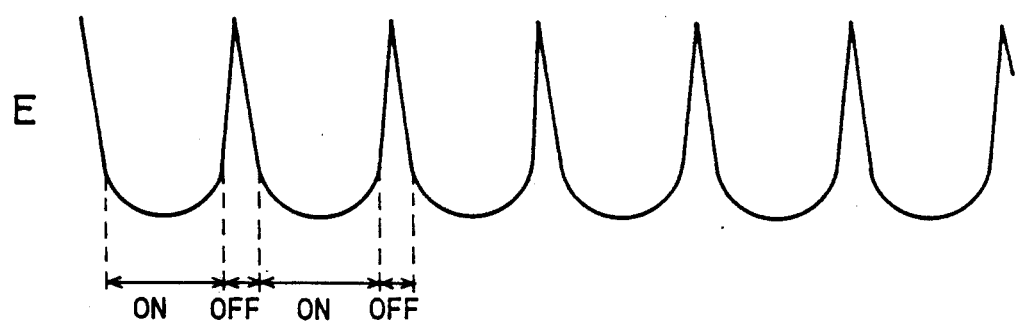
FIG. 2 and FIG. 3 are waveform diagrams for illustrating operation of the circuit shown in FIG. 1.
Figure 3:
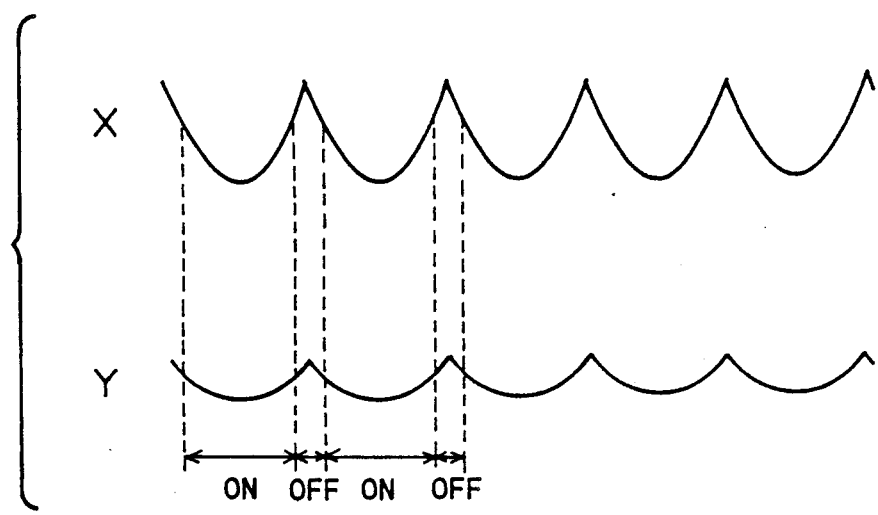

Since the light source I is a flashing one, output voltages X and Y of the I-V conversion circuits 11 and 12 have waveforms which are synchronous to flashing of the light source 1, as hereinabove described (see FIG. 3). Therefore, the output voltage E of the subtraction circuit 13 also has a waveform which is synchronous to flashing of the light source 1 (see FIG. 5). The output voltage E of the subtraction circuit 13 is supplied to the ripple detecting circuit 16 and the holding circuit 17.

The ripple detecting circuit 16 outputs the signal P according to the frequency of the output voltage E of the subtraction circuit 1. Referring to FIG. 6, the output voltage E of the subtraction circuit 13 is directly supplied to the plus input of the operational amplifier 18, while being supplied to the minus input of the operational amplifier 18 through the low-pass filter 19. The low-pass filter 19 is adapted to have a prescribed cut-off frequency, to smooth a voltage exceeding a prescribed frequency. Now it is assumed that a flashing frequency of the light source is in excess of the cut-off frequency of the low-pass filter 19. The output voltage E shown in FIG. 5 from the subtraction circuit 13 is directly supplied to the plus input of the operational amplifier 18. The output voltage E of the subtraction circuit 13 is also supplied to the low-pass filter 19. The low-pass filter 19 smoothes the output voltage E, and supplies the same to the minus input of the operational amplifier 18. The operational amplifier 18 outputs the signal P shown in FIG. 5, which is at a "1" level when the plus input is larger than the minus input, while being at a "0" level when the former is smaller than the latter.

Now it is assumed that the flashing frequency of the light source 1 is smaller than the cut-off frequency of the low-pass filter 19. In this case, an output of the low-pass filter 19 is changed with change in the output voltage E of the subtraction circuit 13. Therefore, the minus input of the operational amplifier 18 does not become smaller than its plus input so that the output signal P from the operational amplifier 18 is maintained at a "0" level. The signal P is supplied to the holding circuit 17.

The holding circuit 17 holds the output voltage E of the subtraction circuit 13 in response to a "0" level of the signal P, while holding the voltage value of the output voltage E immediately before the signal P is converted into a "1" level from a "0" level, in response to a "1" level of the signal p. When the flashing frequency of the light source 1 is in excess of the cut-off frequency of the low-pass filter 19, the switch SW shown in FIG. 7 goes on in response to a "0" level of the signal P. Then, the output voltage E of the subtraction circuit 13 is supplied to the rectifying circuit 14 through the operational amplifier 20. At this time, the capacitor C2 is charged in response to the voltage value of the output voltage E. Thereafter the switch SW goes off in response to a "1" level of the signal P. Then, the charging voltage of the capacitor C2 is supplied to the plus input of the operational amplifier 20, which in turn outputs the charging voltage of the capacitor C2. That is, the holding circuit 17 holds and outputs the output of the subtraction circuit 13 when the light source 1 goes on, while holding and outputting the output of the subtraction circuit 13 in an ON state of the light source 1 when the light source I goes off (see a waveform G shown in FIG. 5).

When the flashing frequency of the light source 1 is smaller than the cut-off frequency of the low-pass filter 19, on the other hand, the signal P is maintained at a "0" level as herinabove described, and hence the switch SW is maintained in an ON state. Thus, the operational amplifier 20 directly outputs the output voltage E of the subtraction circuit 13. The rectifying circuit 14 integrates the output voltage G of the holding circuit 17, and supplies its integrated output to the white balance adjusting circuit 15 as the white balance control voltage F. In response to the voltage value of the white balance control voltage F, the white balance adjusting circuit 5 changes the amplification factor of the respective color signals, to thereby adjust the ratios between the color signals. Referring to FIG. 10, the white balance control voltage F from the rectifying circuit 14 is supplied to the red signal amplifier 15a and the blue signal amplifier 15c. The amplification factors of the red signal amplifier 15a and the blue signal amplifier 15c are adjusted according to the voltage value of the white balance control voltage F. Consequently, the ratios between the red signal, the blue signal and the green signal are adjusted to perform white balance adjustment.

The resistance of the resistor R and the capacitance of the capacitor C1 forming the low-pass filter 19 in the ripple detecting circuit 16 shown in FIG. 6 are appropriately set to change the cut-off frequency. Then the cut-off frequency is set at a limit flashing frequency of the light source 1 substantially allowing no visual recognition. Then, no white balance adjustment is performed on the basis of a signal in an OFF state of the light source 1 when flashing of the light source cannot be visually recognized. Consequently, correct white balance adjustment can be performed.

FIG. 11 is a block diagram showing another embodiment of the present invention. In this embodiment, a ripple detecting circuit 16 is connected to an output of an I-V conversion circuit 12. Output voltage of the I-V conversion circuit 12 has a waveform which is synchronous to flashing of a light source 1, similarly to an output voltage E of a subtraction circuit 13. Therefore, a signal P can be obtained on the basis of an output of the I-V conversion circuit 12, similarly to the above. The ripple detecting circuit 16 may be connected to an output of an I-V conversion circuit 11. Further, the ripple detecting circuit 16 may be connected to an output of a light receiving element 9 or 10.

Figure 12:
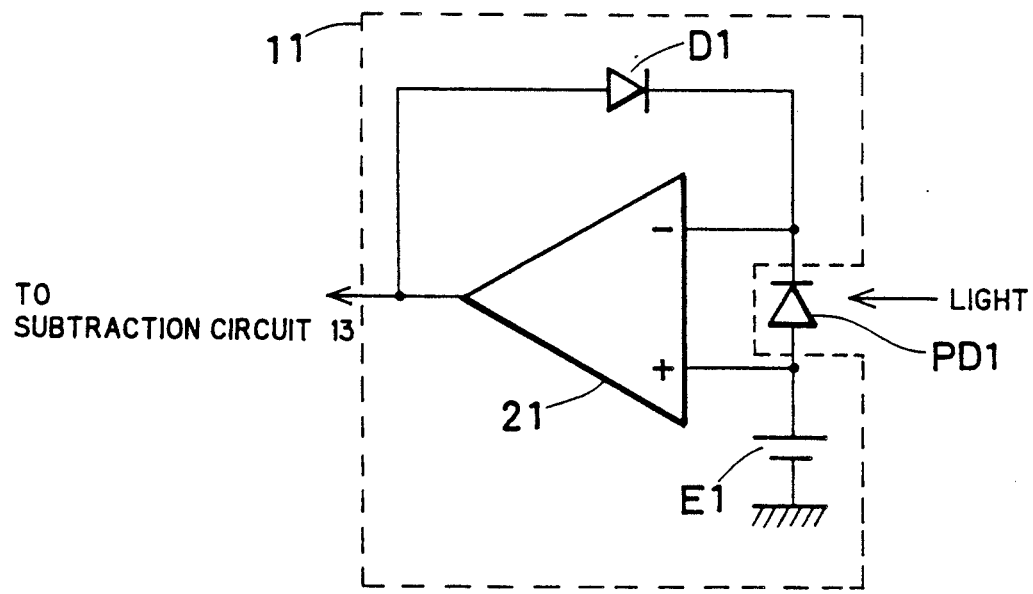
Figure 13:
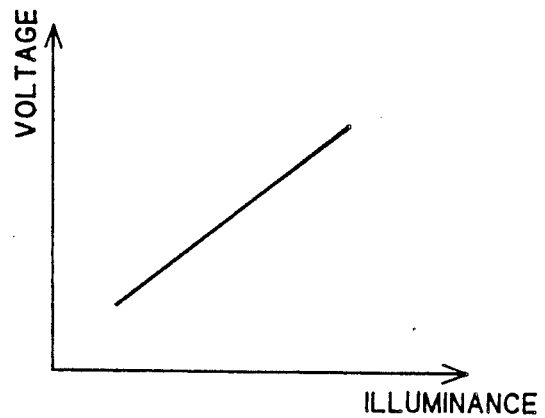
Figure 14:
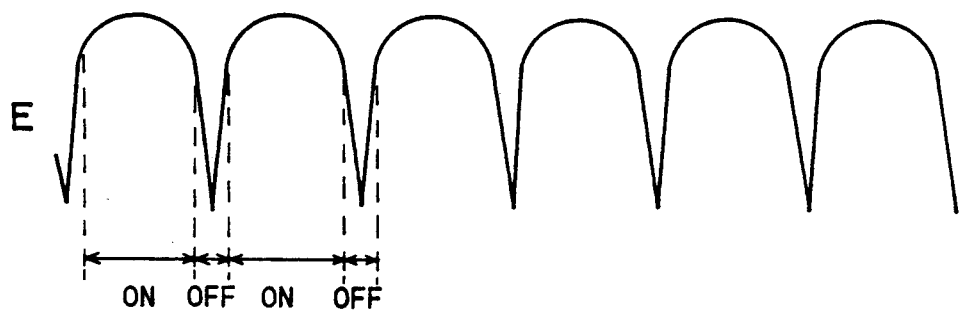
FIG. 14 is an output voltage waveform diagram of a subtraction circuit in the case of structuring a light receiving element and an I-V conversion circuit as shown in FIG. 12.

Although the above embodiment has been described with reference to the light receiving element 9 (10) and the I-V conversion circuit 11 (12) structured as shown in FIG. 8, a photodiode PD1 and a diode D1 may be inverted in polarity with respect to those shown in FIG. 8, as shown in FIG. 12. FIG. 13 is a graph showing relationship between illuminance of light applied to the photodiode PD1 and an output voltage of the I-V conversion circuit 11, when the light receiving element 9 (10) and the I-V conversion circuit 11 (12) are structured as shown in FIG. 12. This graph shows that the output voltage of the I-V conversion circuit 11 is monotonously increased with increase in illuminance of the light applied to the photodiode PD1. Thus, the output voltage E of the subtraction circuit 13 has a waveform shown in FIG. 14 when the light source 1 is a flashing one. Namely, when illuminance of the light emitted from the light source 1 is increased, the output voltage of the subtraction circuit 13 is also increased. Therefore, an output voltage of a holding circuit 17 is inverted in characteristic with respect to that shown In FIG. 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic white balance circuit contained in an image pickup apparatus for automatically adjusting white balance when there is a change in ratios between respective color components include in light applied to an object taken by said image pickup apparatus from a light source, said automatic white balance circuit comprising:

ratio signal generating means for receiving said light from said light source to generate and output a ratio signal indicating a ratio of prescribed two of said color components included in said light;

a ripple detecting circuit for detecting a ripple of said light source to output a first signal in an ON state of said light source and a second signal in an OFF state of said light source when a flashing frequency of said light source exceeds a prescribed frequency and output a third signal when the flashing frequency of said light source is less than the prescribed frequency;

a holding circuit connected to said ratio signal generating means and said ripple detecting circuit for outputting said ratio signal from said ratio signal generating means in response to one of said first and third signals supplied from said ripple detecting circuit while holding and outputting said ratio signal from said ratio signal generating means in an ON state of said light source in response to said second signal; and a white balance adjusting circuit for performing white balance adjustment in accordance with an output from said holding circuit.

2. An automatic white balance circuit in accordance with claim 1, wherein said ratio signal generating means comprises:

first and second filters having different transmission characteristics for extracting first and second color components from said light, first and second light receiving elements operatively coupled to said first and second filters for generating first and second currents according to magnitudes of said first and second color components, respectively first and second current-to-voltage conversion circuits connected to said first and second light receiving elements for converting said first and second currents into first and second voltages, respectively, and a subtraction circuit connected to said first and second current-to-voltage conversion circuit for generating a difference voltage of said first and second voltages.

3. An automatic white balance circuit in accordance with claim 1, wherein said ripple detecting circuit comprises:

a low-pass filter connected to said ratio signal generating means, which has a predetermined cut-off frequency, and a first operational amplifier having first and second inputs connected to said ratio signal generating means and said low-pass filter, respectively, to output said first and second signals on the basis of whether said ratio signal exceeds an output of said low-pass filter when a frequency of said ratio signal is greater than said cut-off frequency end said third signal when the frequency of said ratio signal is smaller than said cut-off frequency.

4. An automatic white balance circuit in accordance with claim 3, wherein said first and third signals includes a signal of "1" level and said second signal includes a signal of "0" level.

5. An automatic white balance circuit in accordance with claim 1, wherein said holding circuit comprises:

a switch having a first end connected to said ratio signal generating means, a second end and a control input connected to said ripple detecting circuit, which is turned on in response to said first and third signal and turned off in response to said second signal, a buffer circuit connected to said second end of said switch, and a capacitor connected across said second end of said switch and a ground.

6. An automatic white balance circuit in accordance with claim 1, wherein said image pickup apparatus includes an image pickup element for receiving light reflected by said object to generate color signals corresponding to color components included in said reflected light.

said white balance adjusting circuit comprising amplifiers coupled to said image pickup element for amplifying said color signals, respectively, wherein an amplification factor of at least one of said amplifiers is changed according to an output of said holding circuit.

7. An automatic white balance circuit in accordance with claim 1, wherein each said first and second light receiving elements includes photodiode, each said first and second current-to-voltage conversion circuit comprising:

a second operational amplifier having first and second input connected across said photodiode and an output connected to said subtraction circuit, diode connected across said first input of said second operational amplifier and said output of said second operational amplifier, and a power source connected across said second input of said second operational amplifier and a ground.

8. An automatic white balance circuit in accordance with claim 2, wherein
said ripple detecting circuit has an input connected to one of said first and second current-to voltage conversion circuit, said first and second light source and said subtraction circuit to receive an output thereof to detect the ripple of said light source.

9. An automatic white balance circuit in accordance with claim 1, wherein said ripple detecting circuit outputs said first signal when no ripple of said light source is detected.

* * * * *